US012781571B2

(12) United States Patent
Moss et al.

(10) Patent No.: US 12,781,571 B2
(45) Date of Patent: Nov. 3, 2026

(54) EXTENDABLE WALKTHROUGH DEVICE FOR LADDERS

(71) Applicant: LITTLE GIANT LADDER SYSTEMS, LLC, Springville, UT (US)

(72) Inventors: N. Ryan Moss, Mapleton, UT (US); Steven S. Miner, Springville, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 405 days.

(21) Appl. No.: 18/348,957

(22) Filed: Jul. 7, 2023

(65) Prior Publication Data

US 2023/0349235 A1 Nov. 2, 2023

Related U.S. Application Data

(63) Continuation of application No. 16/782,232, filed on Feb. 5, 2020, now Pat. No. 11,732,530.

(60) Provisional application No. 62/801,423, filed on Feb. 5, 2019.

(51) Int. Cl.

*E06C 7/18* (2006.01)
*E06C 1/08* (2006.01)
*E06C 1/12* (2006.01)

(52) U.S. Cl.

CPC ................ *E06C 7/182* (2013.01); *E06C 1/08* (2013.01); *E06C 1/12* (2013.01)

(58) Field of Classification Search

CPC .. E06C 7/182; E06C 1/08; B25G 1/04; B25G 3/12; Y10T 403/32475; B29L 2031/7278; B25J 18/025; F16B 7/182

See application file for complete search history.

(56) References Cited

U.S. PATENT DOCUMENTS 325,441 A * 9/1885 Pearson .................. E06C 7/182 182/175
396,886 A * 1/1889 Meisel .................... E06C 7/182 182/106

(Continued)

FOREIGN PATENT DOCUMENTS

AU 2014101295 A4 * 11/2014 ............ F16B 7/1418
KR 200146389 Y1 * 6/1999 ............... E06C 7/06

OTHER PUBLICATIONS

International Search Report and Written Opinion for PCT Application No. PCT/US2020/016635 dated May 7, 2020.

*Primary Examiner* — Theodore V Adamos
*Assistant Examiner* — Kathleen M. McFarland
(74) *Attorney, Agent, or Firm* — Dorsey & Whitney LLC

(57) ABSTRACT

Various embodiments of ladders and ladder components are provided. In one embodiment, a ladder includes a first rail, a second rail spaced apart from the first rail, and a plurality of rungs extending between and coupled to the first rail and the second rail. A walkthrough device may include a first component having a sleeve coupled to the first rail and a pole a pole slidably coupled to the sleeve between at least two positions including a retracted position and an extended position. In some embodiments, the sleeve may be fixedly coupled with the first rail and intended to remain attached (e.g., not intended for removal by a user). In another embodiment, the first component may be removably attached to the first rail so that a user may utilize and employ the device, and subsequently remove it, as desired.

20 Claims, 12 Drawing Sheets

(56) References Cited

U.S. PATENT DOCUMENTS

| | | | | | |
|---|---|---|---|---|---|
| 758,659 | A * | 5/1904 | Jaeger-Rainer | E06C 1/22 | 182/175 |
| 961,357 | A * | 6/1910 | Ketelsen | E06C 7/182 | 182/125 |
| 1,251,761 | A | 1/1918 | Enke | | |
| 1,379,419 | A | 5/1921 | Reeves | | |
| 1,435,028 | A * | 11/1922 | Stewart | F16B 7/182 | 285/417 |
| 2,010,588 | A * | 8/1935 | Gooden | E06C 7/182 | 182/106 |
| 2,140,828 | A * | 12/1938 | Carle | E06C 1/36 | 248/214 |
| 2,408,372 | A * | 10/1946 | Chase | E06C 7/44 | 182/204 |
| 2,430,161 | A * | 11/1947 | Csencsics | B63B 45/00 | 248/316.4 |
| 2,467,800 | A * | 4/1949 | Backlin | E06C 7/182 | 182/106 |
| 2,640,641 | A * | 6/1953 | Tepper | E06C 7/182 | 182/106 |
| 2,722,360 | A * | 11/1955 | Malm | E06C 1/36 | 182/108 |
| 2,881,028 | A * | 4/1959 | Baird | E06C 7/16 | 182/120 |
| 3,125,317 | A * | 3/1964 | Law | E06C 7/14 | 248/210 |
| 3,288,247 | A * | 11/1966 | Barnes | E06C 1/16 | 182/106 |
| 3,428,147 | A * | 2/1969 | Gordon | E06C 7/44 | 182/204 |
| 3,455,414 | A * | 7/1969 | Higgins | E06C 9/02 | 182/106 |
| 3,469,810 | A * | 9/1969 | Dorris | F16B 2/12 | 248/245 |
| 3,856,112 | A * | 12/1974 | Stewart | E06C 1/22 | 182/172 |
| D236,941 | S * | 9/1975 | Seaverns | D8/72 | |
| 4,025,016 | A * | 5/1977 | Brothers | E06C 7/14 | 248/210 |
| 4,114,250 | A * | 9/1978 | Dent | F16B 39/10 | 411/930 |
| 4,435,105 | A * | 3/1984 | Rampley | F16B 7/1454 | 403/109.5 |
| 4,691,907 | A * | 9/1987 | Yang | B25B 5/163 | 269/152 |
| 4,798,262 | A * | 1/1989 | Margolies | E06C 1/20 | 182/172 |
| 5,024,292 | A * | 6/1991 | Gilbreath | B62D 53/0864 | 182/127 |
| 5,082,088 | A * | 1/1992 | Krause | E06C 1/32 | 182/204 |
| 5,694,695 | A * | 12/1997 | Lund | B25G 1/04 | 30/296.1 |
| 5,902,162 | A * | 5/1999 | Kot | B63H 16/04 | 114/221 R |
| 5,931,258 | A * | 8/1999 | Lorentz | E06C 7/182 | 182/106 |
| 5,941,343 | A * | 8/1999 | Kelsey | E06C 7/182 | 182/214 |
| 6,012,546 | A * | 1/2000 | Bee | E06C 7/44 | 182/109 |
| 6,095,283 | A * | 8/2000 | Ellis | E06C 1/38 | 182/106 |
| 6,152,261 | A * | 11/2000 | Hoey | E06C 7/48 | 182/107 |
| 6,234,273 | B1 * | 5/2001 | Moore | E06C 7/44 | 182/201 |
| D443,493 | S * | 6/2001 | Skeem | D8/72 | |
| 6,347,685 | B1 * | 2/2002 | Ellis | E06C 7/182 | 182/106 |
| 6,394,229 | B1 * | 5/2002 | Hastreiter | E06C 1/345 | 248/210 |
| 6,422,341 | B1 * | 7/2002 | Engdahl | E06C 9/02 | 182/103 |
| 6,578,666 | B1 * | 6/2003 | Miller | E06C 1/36 | 182/127 |
| 7,322,442 | B2 * | 1/2008 | Clark | E06C 7/182 | 182/106 |
| 7,789,199 | B2 * | 9/2010 | Wollenberg | E06C 7/48 | 182/201 |
| 7,967,264 | B1 * | 6/2011 | Peterson | E06C 7/143 | 182/115 |
| 8,202,018 | B2 * | 6/2012 | Lipniarski | E06C 7/081 | 403/353 |
| 8,235,175 | B1 * | 8/2012 | Feldhaus | E06C 7/48 | 403/359.1 |
| 8,251,179 | B2 * | 8/2012 | Anderson | B60R 3/007 | 182/106 |
| 8,387,716 | B2 * | 3/2013 | Collin | A01B 73/00 | 172/776 |
| 8,490,250 | B2 * | 7/2013 | Lanz | B25G 3/16 | 16/427 |
| 8,602,163 | B2 * | 12/2013 | Davis, Jr. | E06C 7/48 | 182/106 |
| 8,640,826 | B1 * | 2/2014 | Beilstein | E06C 7/182 | 182/127 |
| 8,839,907 | B2 * | 9/2014 | Davis, Jr. | E06C 7/48 | 182/106 |
| 8,839,908 | B2 * | 9/2014 | Davis, Jr. | E06C 7/182 | 182/106 |
| D719,000 | S * | 12/2014 | Palmer | B62B 1/202 | D8/73 |
| 9,648,805 | B2 * | 5/2017 | Nie | F16B 7/1418 | |
| 9,932,771 | B1 * | 4/2018 | Bramwell | E06C 7/182 | |
| D846,154 | S * | 4/2019 | Coe | D25/68 | |
| 10,655,391 | B1 * | 5/2020 | Clark | E06C 7/488 | |
| 10,883,310 | B2 * | 1/2021 | Johnson | E06C 7/48 | |
| 10,900,282 | B2 * | 1/2021 | Ford | E06C 7/486 | |
| 11,180,956 | B2 * | 11/2021 | Gaines | E06C 7/182 | |
| 11,466,516 | B2 * | 10/2022 | Clark | E06C 7/182 | |
| 11,732,530 | B2 * | 8/2023 | Moss | E06C 1/08 | 182/106 |
| 2004/0018043 | A1 * | 1/2004 | Yu | F16B 7/182 | 403/109.4 |
| 2004/0046163 | A1 * | 3/2004 | Broad | E06C 7/183 | 256/67 |
| 2004/0206575 | A1 * | 10/2004 | Wollenberg | E06C 7/48 | 182/107 |
| 2005/0211502 | A1 * | 9/2005 | LaBrash | B60R 3/02 | 182/127 |
| 2005/0236227 | A1 * | 10/2005 | Clark | E06C 7/182 | 182/106 |
| 2008/0190630 | A1 * | 8/2008 | Collin | A01B 23/04 | 403/306 |
| 2008/0190692 | A1 * | 8/2008 | Feik | E06C 7/182 | 182/107 |
| 2008/0202850 | A1 * | 8/2008 | Anderson | E06C 7/48 | 182/106 |
| 2010/0213007 | A1 * | 8/2010 | Richards | E06C 1/08 | 182/107 |
| 2010/0230208 | A1 * | 9/2010 | Hsiao | E06C 7/182 | 182/129 |
| 2010/0310306 | A1 * | 12/2010 | Wright | B25G 1/04 | 403/109.1 |
| 2011/0017549 | A1 * | 1/2011 | Lietz | E06C 7/10 | 182/172 |
| 2011/0168491 | A1 * | 7/2011 | Cheatham, Jr. | E06C 5/24 | 280/166 |
| 2011/0247895 | A1 * | 10/2011 | Smith | E06C 7/165 | 182/106 |
| 2013/0270037 | A1 * | 10/2013 | Pensieri | E06C 7/44 | 182/107 |
| 2015/0090531 | A1 * | 4/2015 | Yang | E06C 7/46 | 182/104 |
| 2015/0108728 | A1 * | 4/2015 | Nie | A01D 34/824 | 403/109.1 |
| 2016/0123079 | A1 * | 5/2016 | Ballard | E06C 7/46 | 182/207 |

(56) References Cited

U.S. PATENT DOCUMENTS

| | | | | |
|---|---|---|---|---|
| 2017/0335627 | A1* | 11/2017 | Parker | E06C 7/426 |
| 2018/0036868 | A1* | 2/2018 | Maki | B25G 1/04 |
| 2018/0094488 | A1* | 4/2018 | Major | E06C 7/44 |
| 2018/0187486 | A1* | 7/2018 | Ford | E06C 7/486 |
| 2018/0215304 | A1* | 8/2018 | Jevaney | E06C 5/20 |
| 2018/0258697 | A1* | 9/2018 | Torin | E06C 7/182 |
| 2018/0327002 | A1* | 11/2018 | Nasrabad | B61D 23/00 |
| 2018/0335063 | A1* | 11/2018 | Gooden | B25G 1/04 |
| 2019/0061629 | A1* | 2/2019 | Gemme | E06C 7/182 |
| 2019/0145170 | A1* | 5/2019 | Clark | E06C 7/06 182/104 |
| 2019/0257152 | A1* | 8/2019 | MacKarvich | E06C 7/48 |
| 2020/0063491 | A1* | 2/2020 | Green | E06C 1/24 |
| 2020/0149348 | A1* | 5/2020 | Khwaja | E06C 1/12 |
| 2020/0248507 | A1* | 8/2020 | Moss | E06C 7/182 |
| 2020/0378184 | A1* | 12/2020 | Pettit | E06C 7/083 |
| 2021/0010327 | A1* | 1/2021 | Boyer | E06C 1/393 |
| 2021/0198946 | A1* | 7/2021 | Nitz | E06C 7/423 |
| 2021/0254407 | A1* | 8/2021 | Elmore | E06C 7/188 |
| 2021/0340816 | A1* | 11/2021 | Helmick | E06C 7/182 |
| 2022/0112768 | A1* | 4/2022 | Lopez | E06C 7/182 |

* cited by examiner

EXTENDABLE WALKTHROUGH DEVICE FOR LADDERS

CROSS-REFERENCE TO RELATED APPLICATIONS

This application is a continuation of U.S. patent application Ser. No. 16/782,232 entitled EXTENDABLE WALKTHROUGH DEVICE FOR LADDERS, filed on Feb. 5, 2020, which claims the benefit of U.S. Provisional Patent Application No. 62/801,423 entitled EXTENDABLE WALKTHROUGH DEVICE FOR LADDERS, filed on Feb. 5, 2019, the disclosures of which are incorporated by reference herein in their entireties.

BACKGROUND

Ladders are conventionally employed to provide a user thereof with improved access to locations that might otherwise be inaccessible. Ladders come in many shapes, sizes, and configurations such as straight ladders, straight extension ladders, stepladders, and combination step and extension ladders (referred to herein as combination ladders). Combination ladders incorporate, in a single ladder, many of the benefits of other ladder designs as they can be used as an adjustable stepladder or as an extension ladder.

Ladders are common tools for professional tradesman and homeowners alike. Sometimes the use of a ladder can be an awkward experience, even for those who use ladders on a regular basis, when certain tasks are to be performed while standing on the rungs of a ladder. For example, it can be easy to lose one's balance on a ladder while working on an overhead project (e.g., painting a ceiling, changing a light bulb, etc.).

One circumstance that can be challenging when using ladders includes exiting an upper portion of the ladder onto another surface. For example, when a combination ladder, a straight ladder or an extension ladder is used to access a roof, the transition from the ladder to the roof (and vice versa) introduces potential for slipping, tripping or falling with the attendant risk of substantial injury. Thus, it is sometimes desirable to provide so-called walkthrough devices to offer a structure that a user can grab or otherwise interact with in providing stability during such transitions.

While various accessories or "add-on" components may help to provide an improved stability and safety, sometimes such accessories make the ladder more of a burden to use. For example, adding on a walkthrough device to the upper end of a ladder may effectively make the ladder longer and more difficult to maneuver. Or, alternatively, the issue of assembling a walkthrough device to the top of the ladder while standing on the ladder can become burdensome and introduce new risks of slipping or falling from the ladder. Thus, in some instances, users would prefer to do without accessories or features that might otherwise provide increased stability or safety during use of a ladder.

It is a continual desire within the industry to improve various aspects of ladders including their safety, functionality, ergonomics and efficiency of use.

SUMMARY

Embodiments of ladders and components for use with ladders are provided herein. For example, embodiments of walkthrough devices for use with ladders to assist a user during transition from an upper end of a ladder to another surface or structure are provided. In one embodiment, a ladder is provided that comprises a first rail, a second rail spaced apart from the first rail, and a plurality of rungs extending between and coupled to the first rail and the second rail. The ladder further includes a walkthrough device having a first component, the first component comprising a sleeve coupled to the first rail and a pole slidably coupled to the sleeve between at least two positions including a retracted position and an extended position.

In one embodiment, the first component includes at least one bracket, the at least one bracket coupling at least one of the sleeve and the pole to the rail.

In one embodiment, the ladder further comprises a locking mechanism associated with the at least one bracket, the locking mechanism and at least one bracket configured to facilitate removable coupling of the sleeve to the first rail.

In one embodiment, the locking mechanism includes a nut fixed to the at least one bracket, a rod threadably coupled with the nut, and a clamping block coupled to an end of the rod.

In one embodiment, the clamping block is configured to engage a corner defined by a web portion and a flange portion of the first rail and apply pressure to at least one of the web portion and the flange portion.

In one embodiment, the ladder further comprises an adjustment mechanism coupled to the sleeve and configured to selectively lock the pole in each of the retracted position and the extended position.

In one embodiment, the adjustment mechanism includes a clamping ring and a cammed lever.

In one embodiment, the cammed lever includes an engagement post that is configured to selectively engage an opening in the clamping ring and an aligned opening in the pole.

In one embodiment, the ladder further comprises a cap coupled to a lower end of the pole, the cap having a first keyed feature and an insert member positioned at least partially within the sleeve, the insert member having a second keyed feature configured to engage with the first keyed feature.

In one embodiment, the first keyed feature includes an undulating, upper, peripheral edge, and wherein the second keyed feature includes a mating peripheral edge.

In one embodiment, the ladder further comprises a cap coupled to an upper end of the pole, the cap having a first keyed feature and a collar positioned at an upper end of the sleeve, the collar having a second keyed feature configured to engage with the first keyed feature.

In one embodiment, the first keyed feature includes an undulating, lower, peripheral edge, and wherein the second keyed feature a mating peripheral edge.

In one embodiment, the ladder further comprises a third rail, a fourth rail spaced apart from the third rail, and a second plurality of rungs extending between and coupled to the third rail and the fourth rail.

In one embodiment, the first rail and second rail are slidably coupled to the third rail and fourth rail.

In one embodiment, the walkthrough device includes a second component, the second component comprising a second sleeve coupled to the second rail and a second pole slidably coupled to the second sleeve between at least two positions including a retracted position and an extended position.

In one embodiment, when upper ends of the first component and the second component are spaced away from each other a first distance, lower ends of the first component and the second component are spaced away from each other a second distance, and the first distance is greater than the second distance.

In one embodiment, the pole of the first component is adjustable between its retracted position and its extended position independent of a position of the second pole.

In one embodiment, the first component is positioned on a front side of the first rail.

In one embodiment, a longitudinal axis of the pole forms an angle with a longitudinal axis of the first rail, and wherein the angle is between approximately 0 degrees and approximately 8 degrees.

In one embodiment, the angle is between approximately 3 degrees and approximately 4 degree.

In accordance with another embodiment, another ladder is provided that comprises a first rail, a second rail spaced apart from the first rail, and a plurality of rungs extending between and coupled to the first rail and the second rail. The ladder further includes a walkthrough device including a first component, the first component comprising a first elongated structure coupled to the first rail and a second elongated structure slidably coupled to the first elongated structure and configured to be displaced relative to the first elongated structure between at least two positions including a retracted position and an extended position.

The ladder may further include any of the various elements or limitations as set forth above and as explained in greater detail below.

In accordance with another embodiment, a walkthrough device for use with a ladder is provided. The device comprises a sleeve, a pole slidably coupled to the sleeve and configured for displacement relative to the sleeve between at least two positions including a retracted position and an extended position, at least one bracket configured for coupling with a rail of a ladder, and an adjustment mechanism coupled to the sleeve and configured to selectively lock the pole in each of the retracted position and the extended position.

The walkthrough deice may further include any of the various elements or limitations set forth above and as explained in greater detail below regarding various embodiments of walkthrough devices. Thus, elements, components or features of one embodiment may be combined with elements, components or features of other described embodiments without limitation.

BRIEF DESCRIPTION OF THE DRAWINGS

The foregoing and other advantages of the invention will become apparent upon reading the following detailed description and upon reference to the drawings in which.

DETAILED DESCRIPTION

Figure 1:
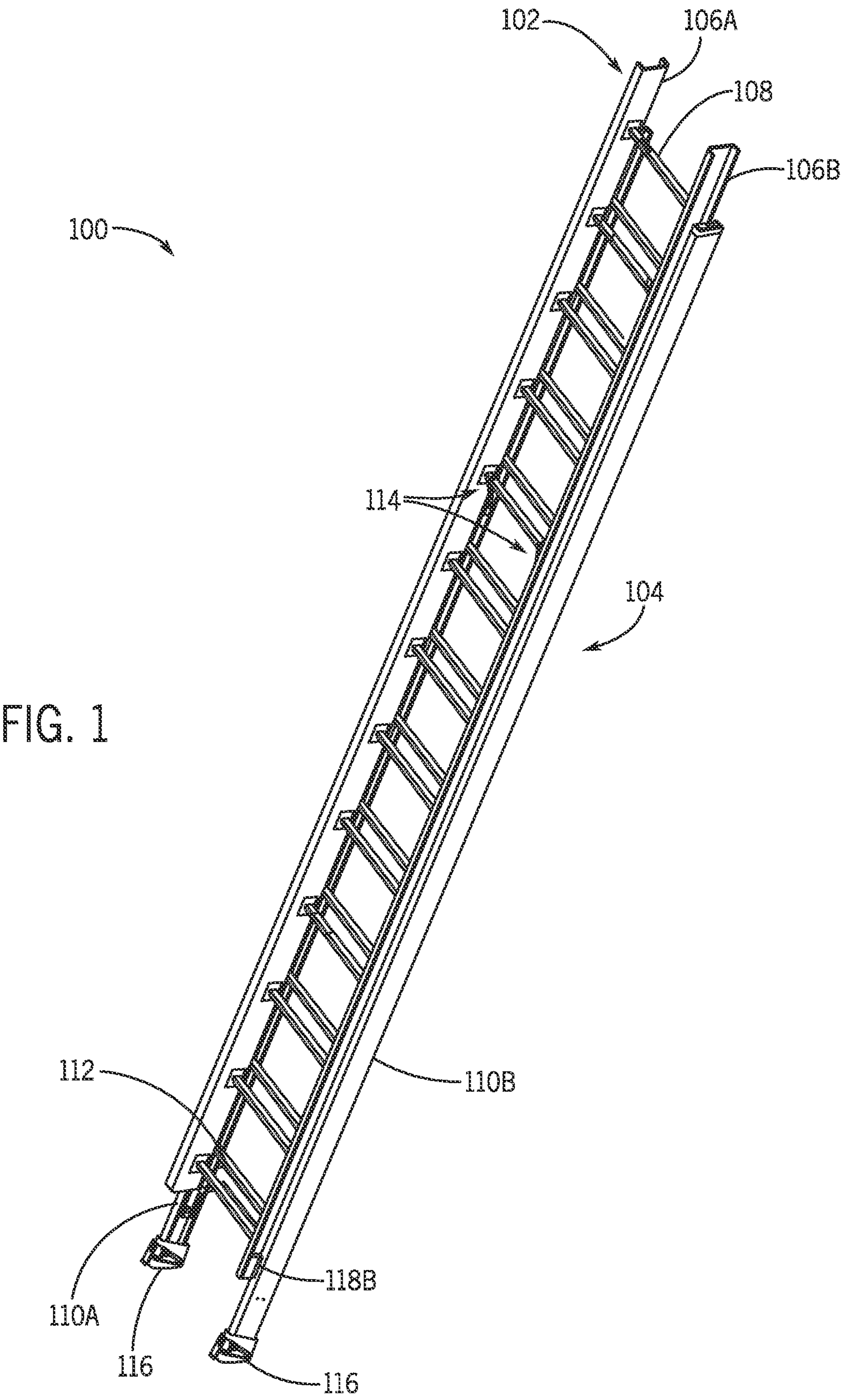
FIG. 1 is a perspective view of an extension ladder according to an embodiment of the present disclosure.

Referring to FIG. 1, a ladder 100 is shown according to an embodiment of the disclosure. The ladder 100 is configured as an extension ladder and includes a first assembly, which may be referred to as a fly section 102, and a second assembly, which may be referred to as a base section 104, the fly section 102 being slidably coupled with the base section 104 such that the overall height of the ladder may be extended or contracted within specified limits. The fly section 102 includes a pair of spaced apart rails 106A and 106B (generally referenced as 106 herein for purposes of convenience) with a plurality of rungs 108 extending between, and coupled to, the rails 106. Similarly, the base section 104 includes a pair of spaced apart rails 110A and 110B (generally referenced herein as 110 for purposes of convenience) with a plurality of rungs 112 extending between, and coupled to, the rails 110.

The rails 106 and 110 may be formed of a variety of materials. For example, the rails may be formed from composite materials, including fiberglass composites. In other embodiments, the rails 106 and 110 may be formed of a metal or metal alloy, including, for example, aluminum and aluminum alloys. The rails 106 and 110 may be formed using a variety of manufacturing techniques depending on various factors including the materials from which they are formed. For example, when formed as a composite member, rails may be formed using pultrusion or other appropriate processes associated with composite manufacturing. In one embodiment, the rails 106 and 110 may be formed generally as C-channel members exhibiting a substantially "C-shaped" cross-sectional geometry such as depicted in the drawings.

The rungs 108 and 112 may also be formed from a variety of materials using a variety of manufacturing techniques. For example, in one embodiment, the rungs 108 and 112 may be formed from an aluminum material through an extrusion process. However, such an example is not to be viewed as being limiting and numerous other materials and methods may be utilized as will be appreciated by those of ordinary skill in the art. In one embodiment the rungs 108 and 112 may include a flange member (also referred to as a rung plate) for coupling to associated rails 106 and 110. For example, the flanges may be riveted or otherwise coupled with their associated rails 106 and 110.

One or more mechanisms, often referred to as a rung lock 114, may be associated with the first and second assemblies 102 and 104 to enable selective positioning of the fly section 102 relative to the base section 104. This enables the ladder 100 to assume a variety of lengths (or, rather, heights when the ladder is in an intended operating orientation) by sliding the fly section 102 relative to the base section 104 and locking the two assemblies in a desired position relative to one another. By selectively adjusting the two rail assemblies (i.e., fly section 102 and base section 104) relative to each other, a ladder can be extended in length to nearly double its height as compared to its collapsed or shortest state as will be appreciated by those of ordinary skill in the art. The rung lock 114 maybe cooperatively configured with the fly section 102 and the base section 104 such that when the fly section 102 is adjusted relative to the base section 104, the associated rungs 108 and 112 maintain a consistent spacing (e.g., 12 inches between rungs that are immediately adjacent, above or below, a given rung).

A foot 116 may be coupled to the lower end of each rail 110 of the base section 104 to support the ladder 100 on the ground or other surface. The foot 116 may be configured so that it may be selectively adapted for use on an interior surface (e.g., the floor of a building), or on an external surface such as the ground as will be discussed in further detail below.

The ladder 100 may additionally include a number of other components such as described, for example, in U.S. Patent Application Publication No. US2016/0123079, entitled EXTENSION LADDER, LADDER COMPONENTS AND RELATED METHODS, published on May 5, 2016, and U.S. Patent Application Publication No. US2018/0094488, entitled LADDERS, MECHANISMS AND COMPONENTS FOR LADDERS, AND RELATED METHODS, published on Apr. 5, 2018, the disclosures of each of which are incorporated by reference herein in their entireties.

Referring now to FIGS. 2-5, a walkthrough device 200 is shown coupled to an upper portion of a ladder—such as the ladder 100 shown in FIG. 1. The walkthrough device 200 may include a single extendable component 202A, or it may comprise a pair of extendable components 202A and 202B. The components 202A and 202B may be configured to be substantially identical, although mirrored, and therefore, may be referred to as "component 202" for purposes of convenience herein.

Each component 202 may include a sleeve 204 coupled with one or more brackets 206. The brackets 204 are, in turn, coupled with a corresponding pair of rails of the ladder 100, in this case the rails 106A and 106B of the fly section 102. In one embodiment, the brackets 206 may be used to couple the sleeve 204 to the rails 106A and 106B in a manner such that the components 202 remain fixed to the rails (i.e., not configured to be easily removed by a consumer without incurring damage to the ladder, or at least without significant effort). Thus, for example, the brackets 206 may be riveted or otherwise affixed to the rails 106A and 106B. In another embodiment, the brackets 206 may be removably coupled to the rails 106A and 106B by way of associated locking mechanisms 208 such that the components may be easily installed and removed from the ladder 100 by an average user as shall be discussed in further detail below.

Figure 2:
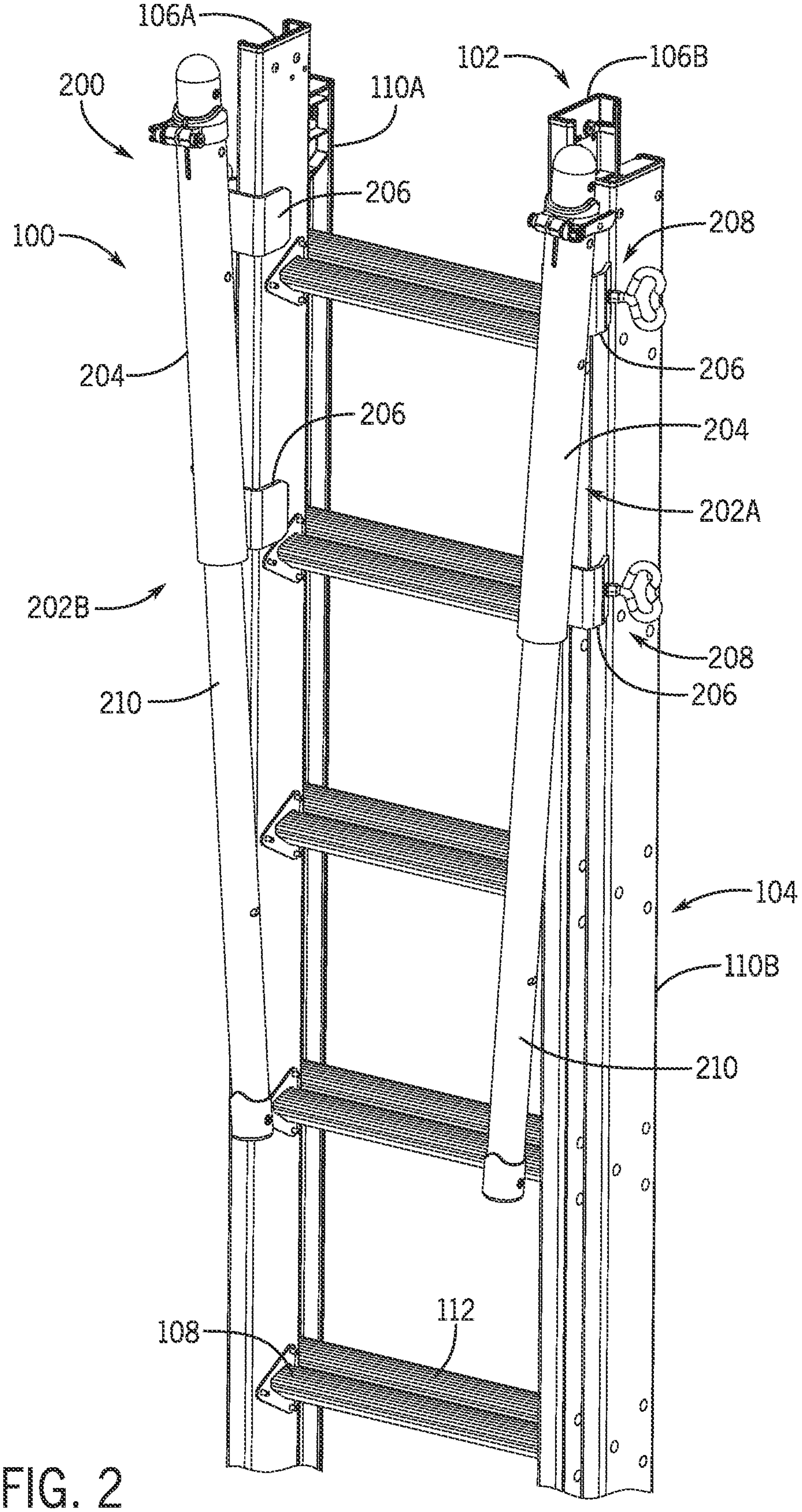
FIG. 2 is a perspective view of an upper portion of the ladder shown in FIG. 1 with a walkthrough device attached thereto and in a retracted state in accordance with an embodiment of the present disclosure.

The components 202 may each further include a pole 210 slidably coupled with the sleeve 204. For example, the pole 210 may be slidably disposed within an internal opening of the tubular sleeve 204. As shown in FIG. 2, each pole 210 may be placed in a first state or position relative to their associated sleeve 204 such that their uppermost ends are positioned at a similar height. In one embodiment, when in this first state the uppermost ends of the poles 210 may be generally adjacent to the upper ends of the associated rails 106A and 106B. Such a position or state may be referred to as a retracted stated. In some embodiments, the lowermost ends of the poles 210, when in the retracted state, may be positioned away from each other at a distance that is approximately the same as the width between the associate rails 106A and 106B so as to minimize or avoid interference with a user's foot as they step on adjacent rungs 108.

Figure 3:
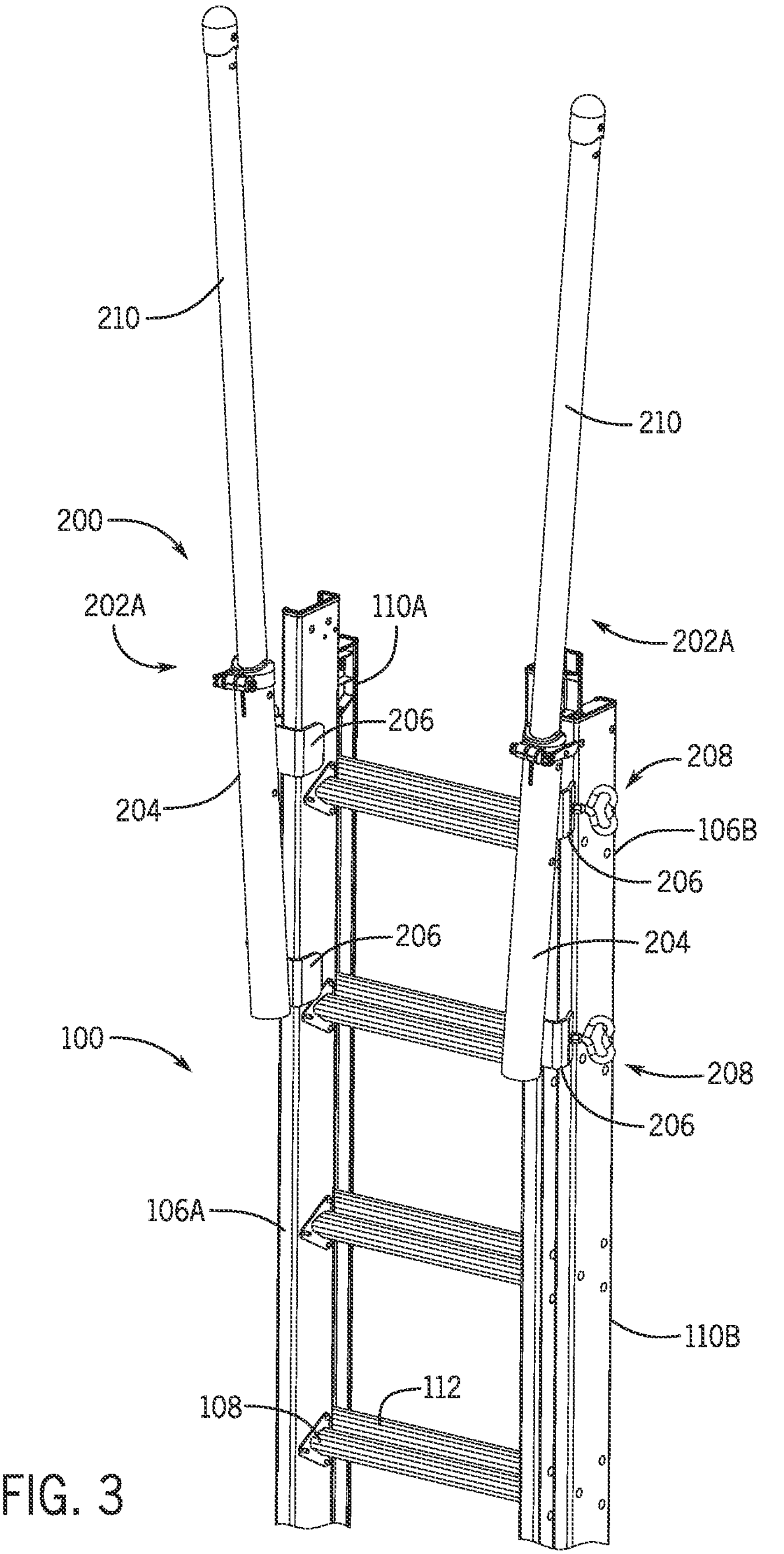
FIG. 3 is the perspective view shown in FIG. 2 with the walkthrough device in an extended state.
Figure 4:
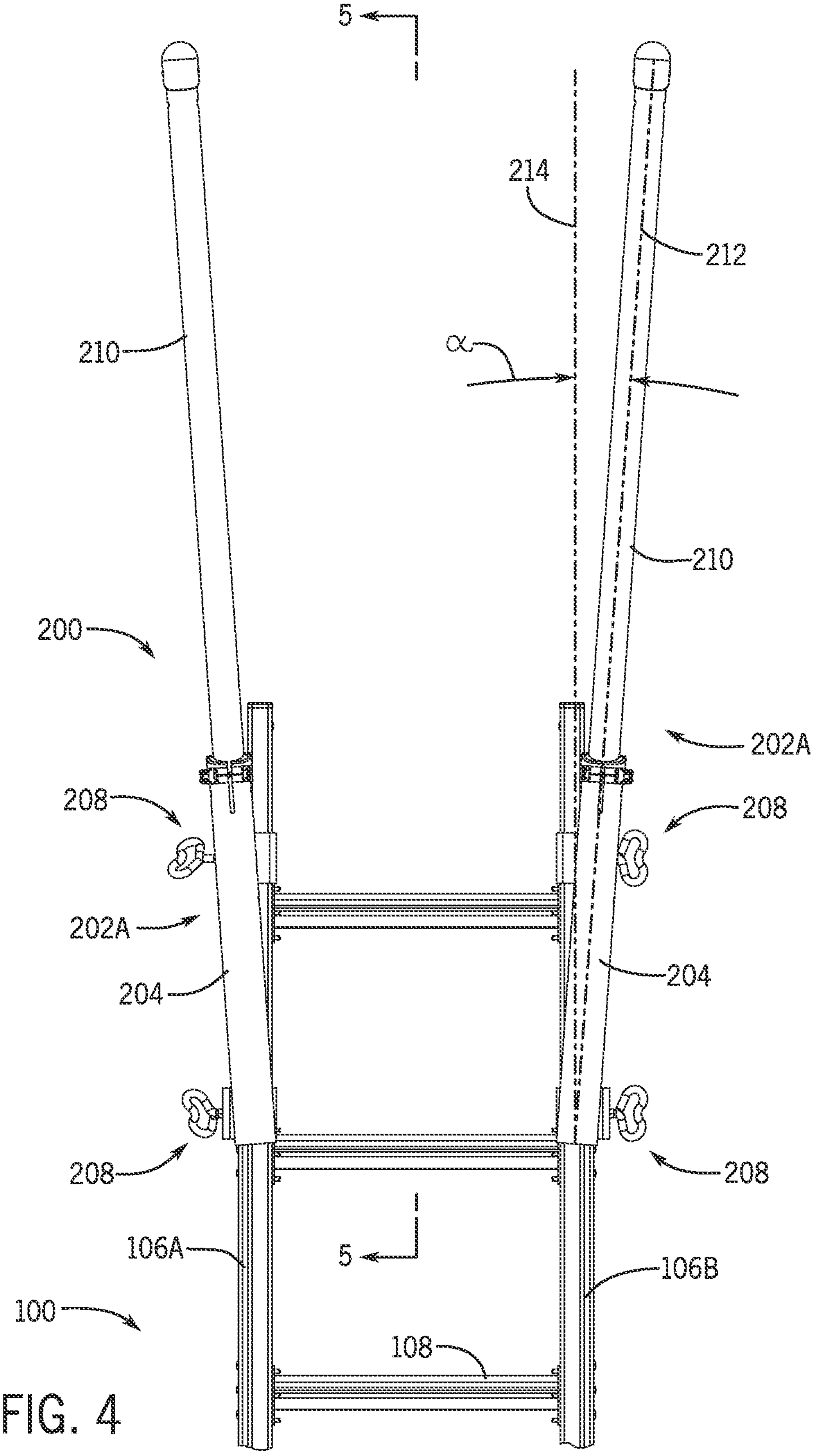
FIG. 4 is a front view of an upper portion of a ladder having a walkthrough device attached thereto and in an extended state.
Figure 5:
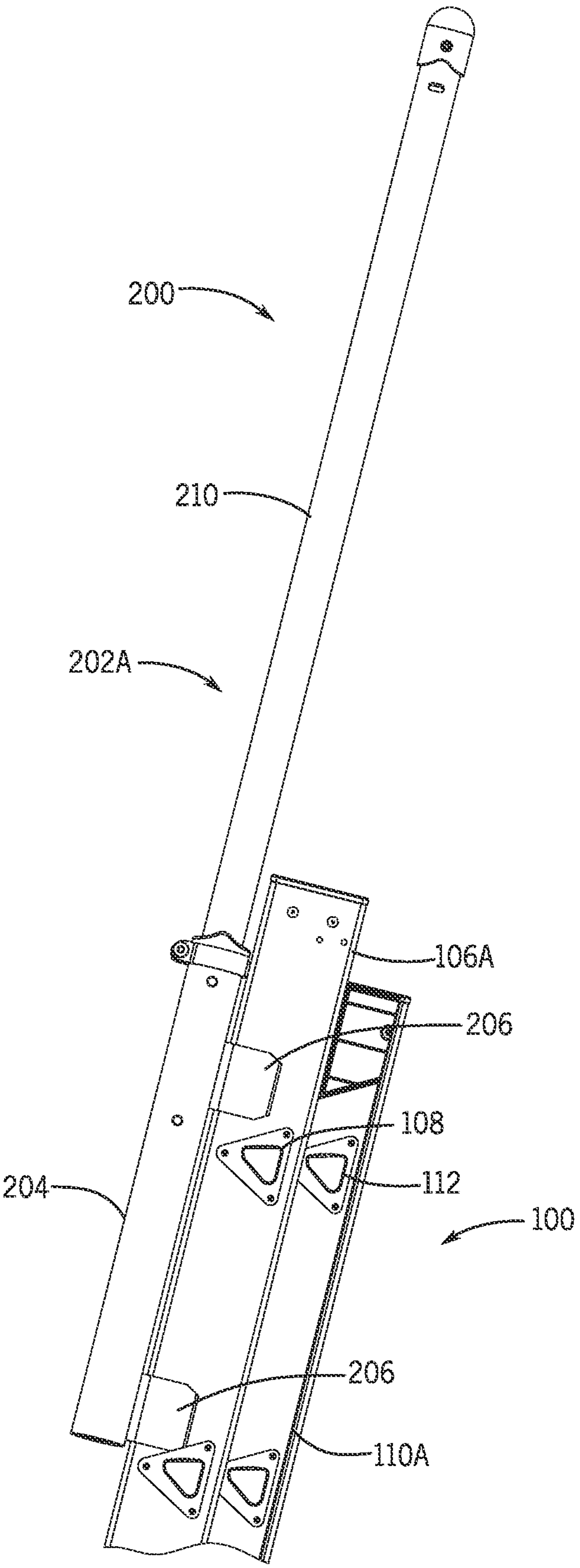
FIG. 5 is a side view of an upper portion of a ladder having a walkthrough device attached thereto and in an extended state.

As shown in FIGS. 3-5, each pole 210 may be placed in at least a second state or position relative to their associated sleeve 204 wherein the poles extend upward beyond the upper ends of the rails 106A and 106B of the fly section 102. In one embodiment, when in the extended state, the poles 210 may extend above the uppermost rung of the ladder a distance of approximately 3 and a half feet. Of course such a distance may be different. For example, the distance may be between approximately 3 feet and approximately 4 feet, or may be between approximately 2 and a half feet and approximately 4 and a half feet. The poles 210 extend high enough above the uppermost rung of the ladder 100 that a user may grasp the poles 210 in their hands and stabilize themselves as they step between the poles 210 from the uppermost rung(s) of the ladder 100 and onto an elevated surface.

It is noted that in other embodiments, the sleeve 204 and the pole 210 may be reversed such that the pole 210 is coupled with a rail 106 by way of a bracket and the sleeve 204 becomes displaceable relative to both the pole 210 and the rail 106. In other embodiments, other components may be used in place of the sleeve 204 and pole 210 to provide two relatively sliding components (e.g., two sliding rails) with one of the components being coupled with the rail.

In one embodiment, such as shown in the drawings, the sleeves 204 and the poles 210 are positioned in front of a face of the ladder 100. Stated another way, the front surfaces of the fly rails 106A and 106B are positioned between the rear surfaces of base rails 110A and 110B and the sleeves 204/poles 210 of the walkthrough device 200. This is so regardless of the position or state of the poles 210 relative to the sleeves 204. Thus, the poles 210 do not cross or intersect a plane defined by the front surfaces of the fly rails 106A and 106B. In another embodiment, the sleeves 204 and poles may be positioned to on the lateral outer side of the rails 106 (e.g., such that the poles 210 are spaced apart a width that is greater than a width of spacing of the associated rails 106). In such an embodiment, the poles 210 may extend substantially parallel to their associated rails 106, or they may exhibit an angle relative to the rails similar to that which is described below with respect to FIG. 4.

As seen in FIG. 4, the poles 200 may be positioned such that their longitudinal axis 212 extends at a desired angle $\alpha$ relative to the longitudinal axis 214 of the associated rail (e.g., 106B as shown in FIG. 4). In one embodiment, the angle $\alpha$ may be approximately 4 degrees. In another embodiment, the angle $\alpha$ may be between approximately 3 degrees and approximately 5 degrees. In another embodiment, the angle $\alpha$ may be between approximately 2 degrees and approximately 6 degrees. In yet another embodiment, the angle $\alpha$ may be between approximately 0 degrees and approximately 8 degrees. In one embodiment, the angle $\alpha$ is approximately 0 degrees. Having an angle $\alpha$ that is 0 degrees or slightly larger provides a desirable spacing for a user to step between the two components 202 when transitioning from an upper rung of the ladder to an elevated surface (e.g., a roof). A positive angle $\alpha$ (e.g., at 1, 2, 3, 4, 5, 6, 7 or 8 degrees) may enable a user to hold the poles 210 at a comfortable and natural hand position as they make such a transition while ensuring the poles are wider than the upper ends of the rails 106A and 106B to avoid interference with a user's foot during a transition from the ladder 100 to an elevated surface.

Figure 6:
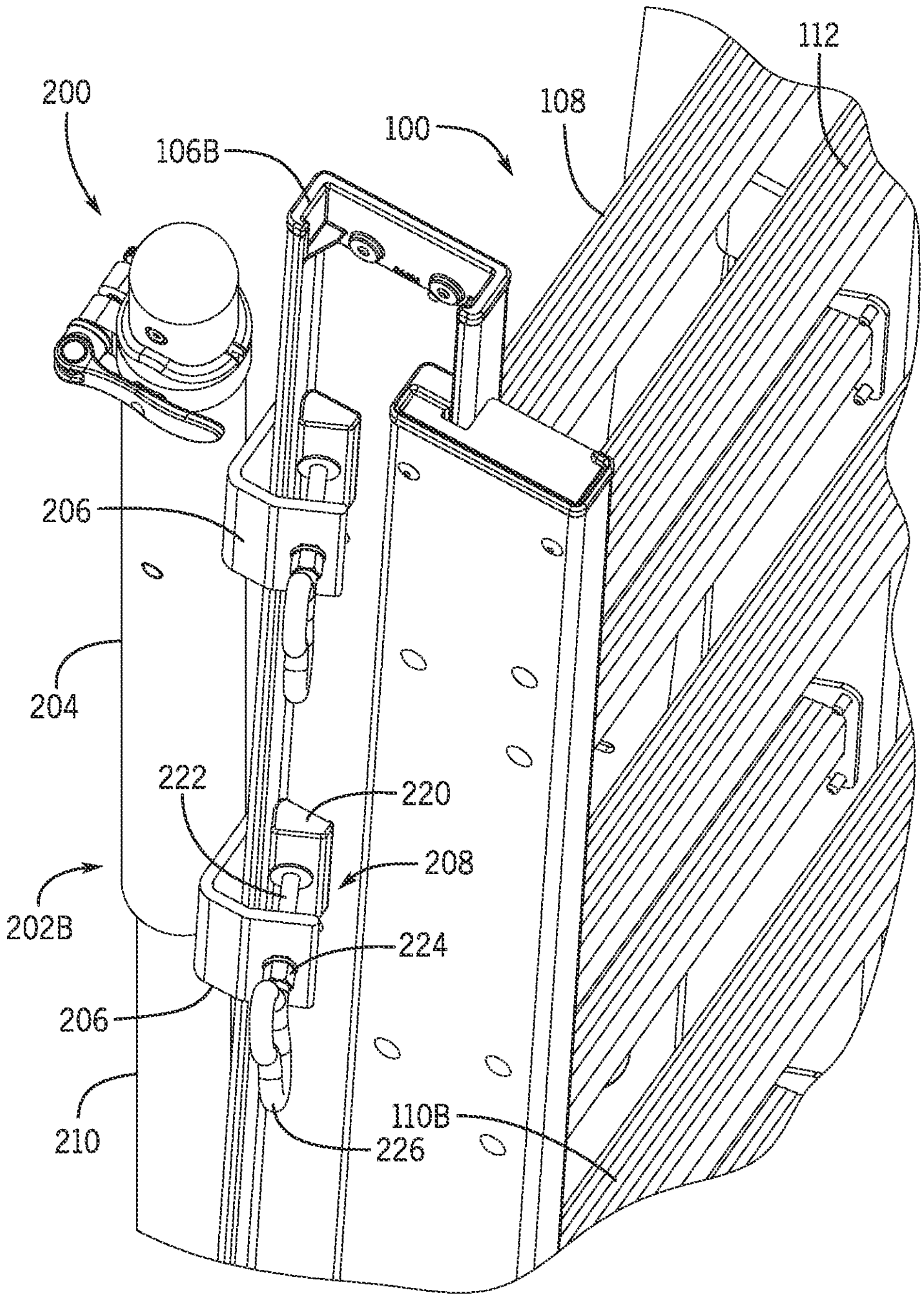
FIG. 6 is another perspective of an upper portion of a ladder with a walkthrough device coupled to a rail thereof.
Figure 7:
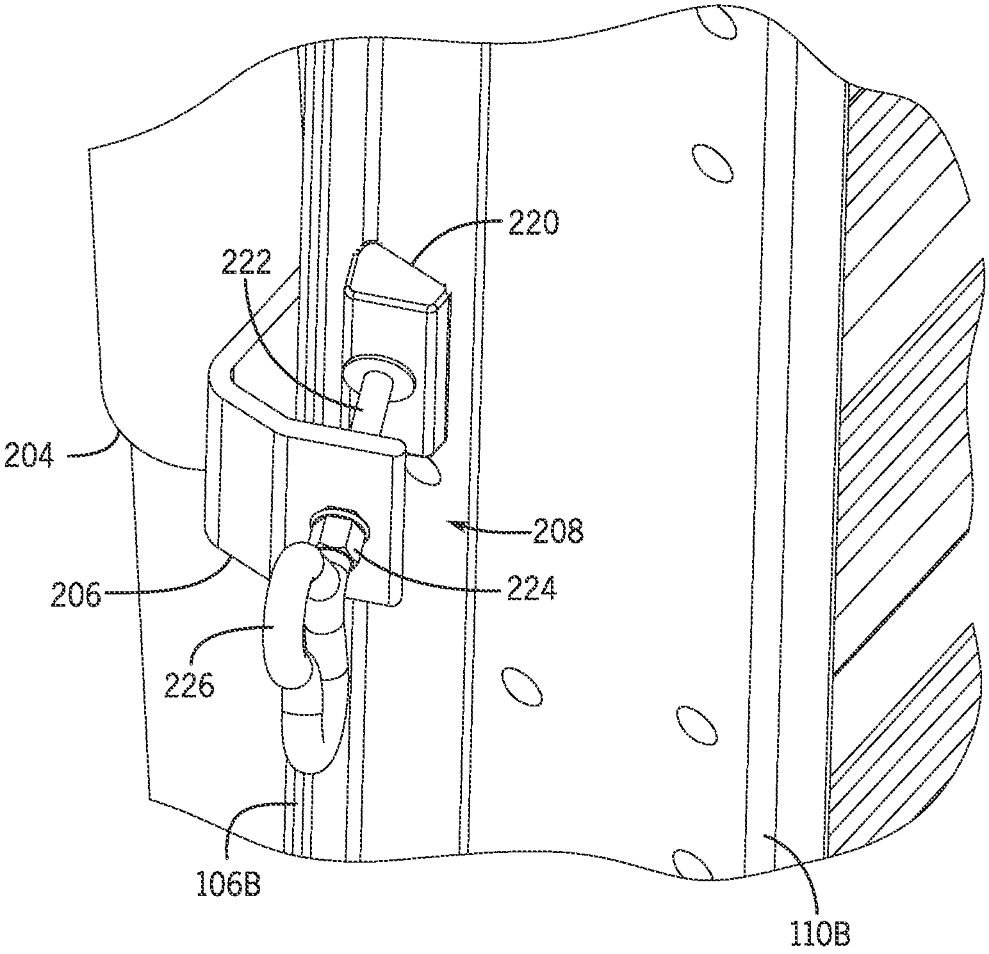
FIG. 7 is an enlarged view taken from FIG. 6.
Figure 8:
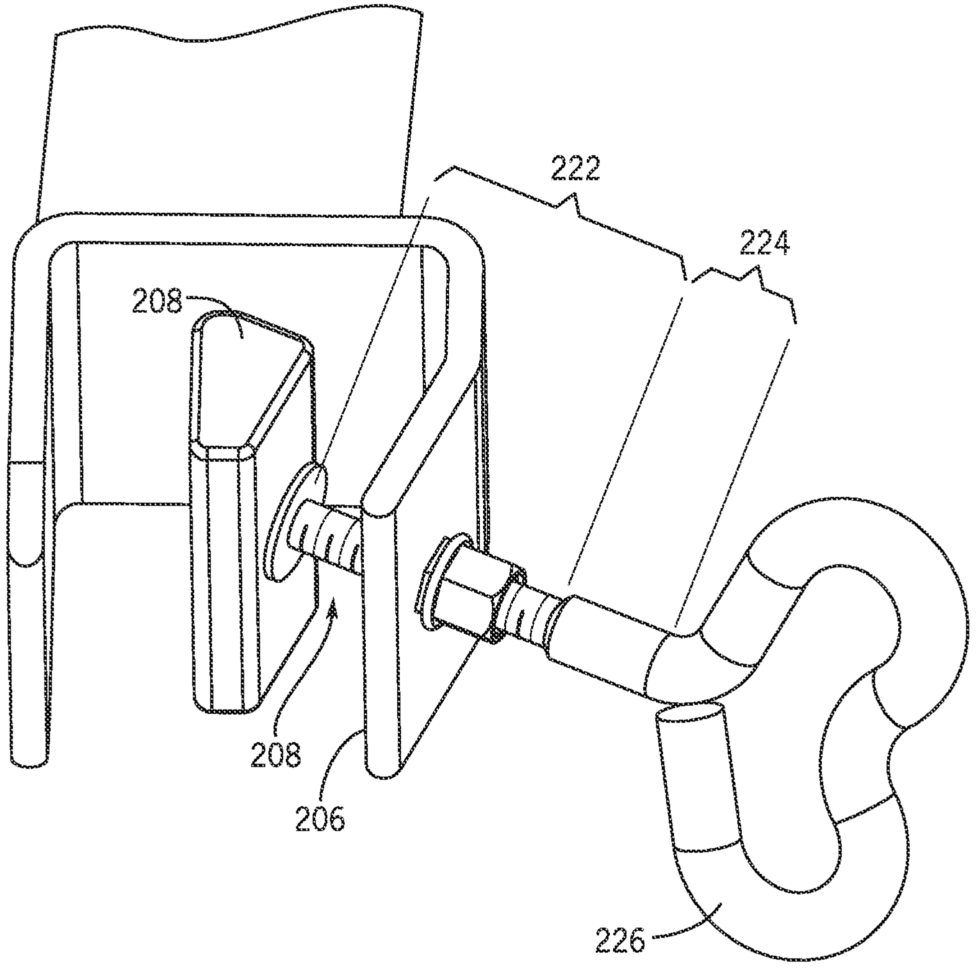
FIG. 8 illustrates a coupling mechanism of a walkthrough device in accordance with an embodiment of the present disclosure.

Referring to FIGS. 6-8, the brackets 206 and locking mechanisms 208 are shown in further detail. In one embodiment, the locking mechanisms 208 may include a clamping block 220, a threaded rod 222 rotatably coupled with the clamping block 220 and threadably coupled with a nut 224 or other female threaded component that is fixed to the bracket 206. A handle 226 may be formed at the end of, or otherwise coupled with, the threaded rod 222. When fastening the components 202A and 202B to the rails of a ladder, a user may rotate the threaded rod 222, using the handle 226, to withdraw the clamping block 220 out towards the nut 224. With the component 202 placed at a desired position relative to its associated rail, the user may rotate the threaded rod 222 such that the clamping block is displaced towards its associated rail, eventually abutting the rail and clamping it between the clamping block 220 and a portion of the bracket 206 (which wraps around from the laterally inner side of the rail 106B (e.g., the same surface two which the rungs may be fastened), around the front of the rail 106B and to the laterally outer side of the rail 106B). In one embodiment, the clamping block 222 is configured to engage a corner of the rail 106B between a web portion and a flange portion and apply pressure to a surface of the web portion, the flange portion, or both the web and flange portions of the rail 106B. Removal of the components 202 includes rotating the rod 222 to withdraw the clamping block 220 back towards the nut 224 until sufficient clearance is provided to remove the component 202 from the rail 206.

Figure 9:
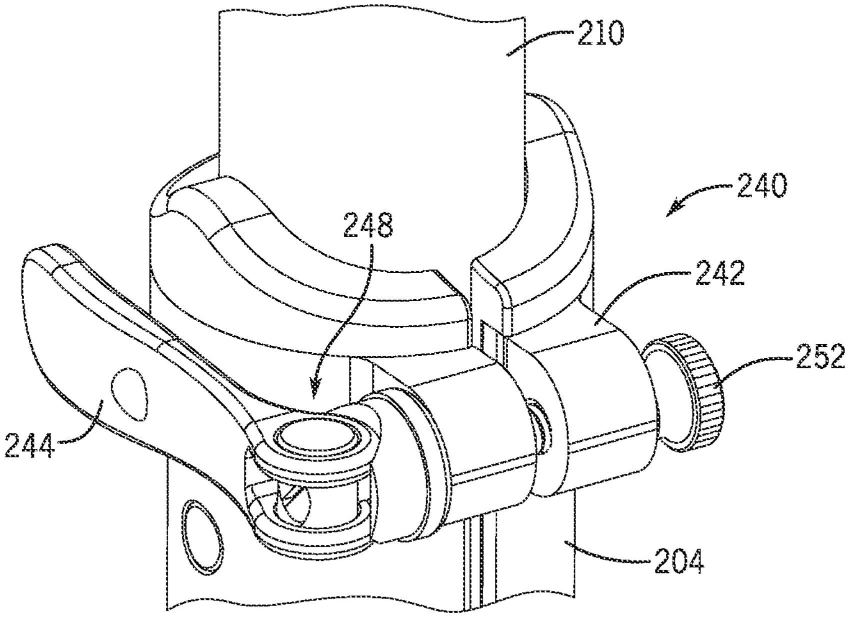
FIGS. 9 and 10 are detailed views of a locking mechanism of a walkthrough device while in a locked state in accordance with an embodiment of the present disclosure.
Figure 10:
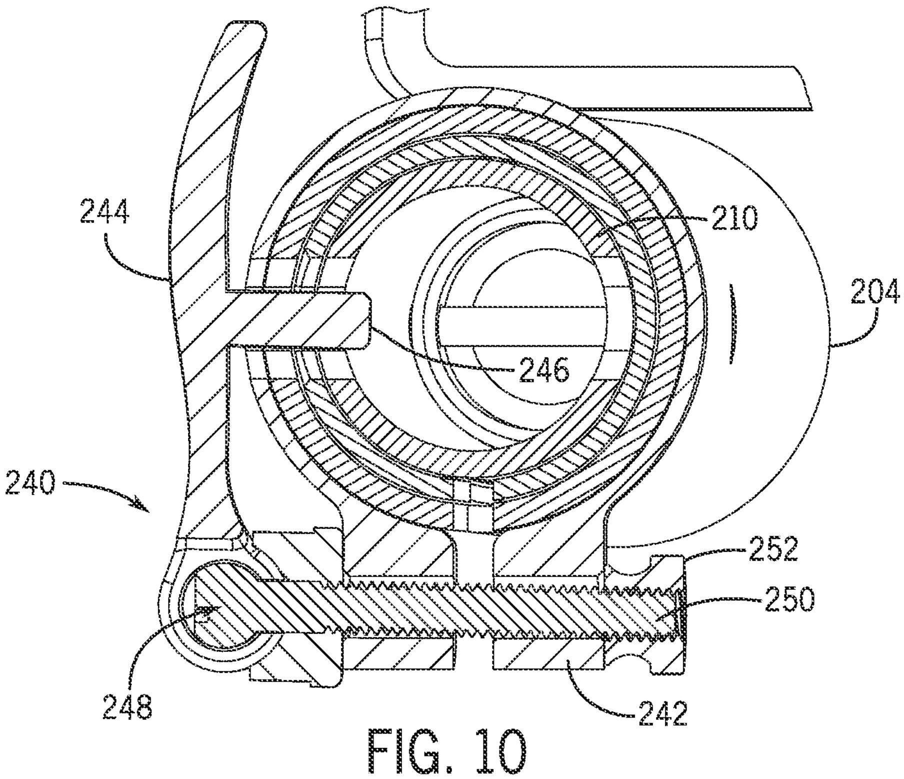

Referring now to FIGS. 9-12, an adjustment mechanism 240 is shown in accordance with an embodiment of the present disclosure. The adjustment mechanism 240 may be used to enable the selective locking of the poles 210 at various positions relative to the sleeve 204 (e.g., in the extended position or in the retracted position). In the embodiment shown in FIGS. 9-12, the adjustment mechanism 240 includes a clamp ring 242 that is coupled with the sleeve 204 and encircles the poles 210. A cammed lever 244 is coupled with the clamp ring 242 enabling the clamp ring to be in an engaged or clamped position, as shown in FIGS. 9 and 10, wherein the clamp ring 242 frictionally grasps the pole 210 to hold it in position relative to the sleeve 210. Additionally, an engagement post 246 may be positioned on a portion of the cammed lever 244 (distal from the pivot point 248 of the cammed lever 244) for engagement with an opening in the clamp ring 242 and an aligned opening in the pole 210, thereby providing an interference or an abutting stop to also prevent or limit the pole 210 from moving relative to the sleeve 204.

Figure 11:
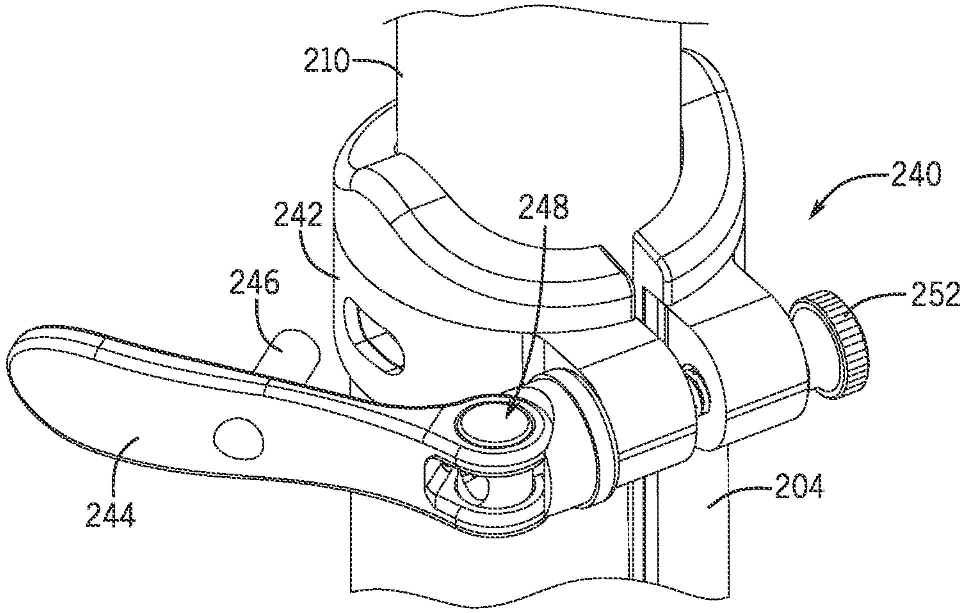
FIGS. 11 and 12 are detailed views of a locking mechanism of a walkthrough device while in an unlocked state in accordance with an embodiment of the present disclosure.
Figure 12:
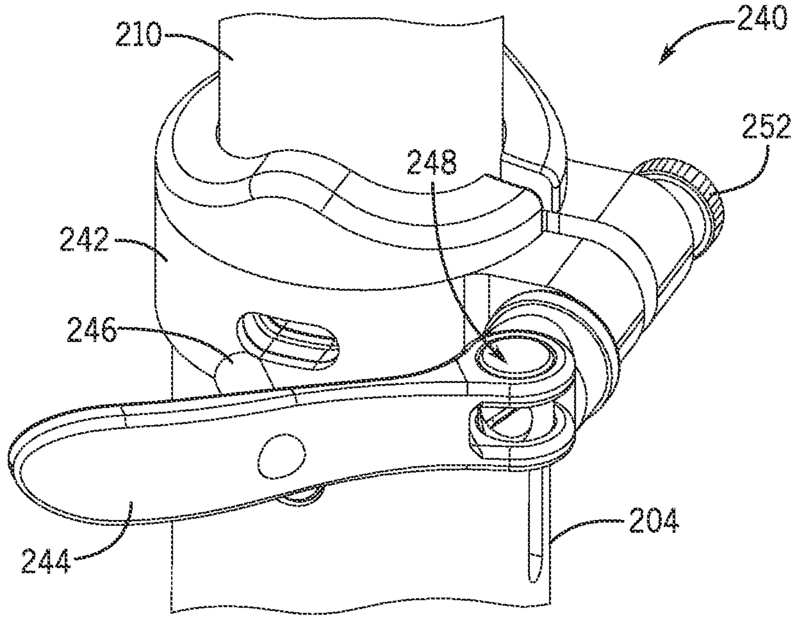

When the cammed lever 244 is rotated about its pivot point 248 to an “open” position, such as shown in FIGS. 11 and 12, the engagement post 246 is withdrawn at least from the opening in the pole 210, and may be additionally withdrawn from the opening in the clamping ring 242, and the clamp ring is loosened about the pole 210 enabling the pole 210 to slide and/or rotate relative to its associated sleeve 204. Thus, opening the cammed lever 244 enables adjustment or displacement of the pole 210 between the retracted position and the extended position—as well as intermediate positions if so desired.

The cammed lever 244 may tighten and loosen the clamping ring by applying and releasing a tensile force, respectively, to a threaded pin 250, which is coupled to the cammed lever 244 at one end and is coupled to a threaded nut 252 or cap member at its other end. The threaded nut 252 may be adjusted on the pin 250 in order to adjust the level of clamping force applied to the pole 210 by the clamping ring 240.

Other locking mechanisms may be employed for locking the pole 210 in a desired position relative to the sleeve 204. For example, a twist-lock mechanism may be employed to effect a locking/unlocking arrangement upon rotation of the pole 210 about its longitudinal axis relative to the sleeve 204, or upon rotation of a collared mechanism associated with the pole 210 and sleeve 204. Nonlimiting examples of such mechanisms may be found in U.S. Pat. No. 5,694,695 entitled COUPLER SYSTEM FOR TELESCOPING POLES, issued on Dec. 9, 1997, U.S. Patent Publication No. 20100310306 entitled IMPROVED INTERNAL LOCKING DEVICE FOR EXTENDABLE TELESCOPIC POLES, published on Dec. 9, 2010, and U.S. Patent Publication No. 20180335063 entitled LOCKING EXTENSION POLE, published on Nov. 22, 2018, the disclosures of which are incorporated by reference herein in their entireties.

Figure 13C:
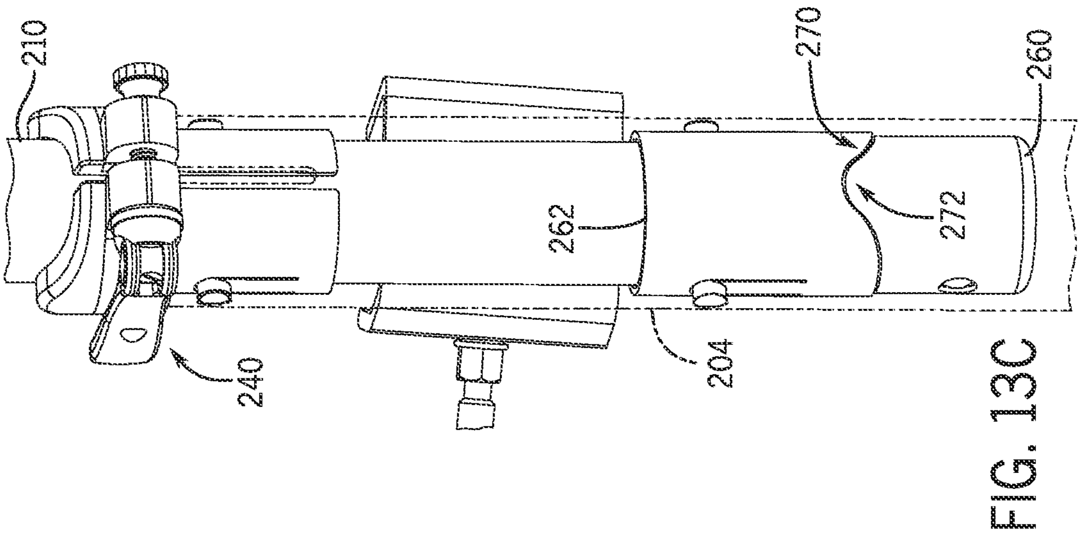
FIGS. 13A-13C show a walkthrough device being aligned as it is being extended.
Figure 13B:
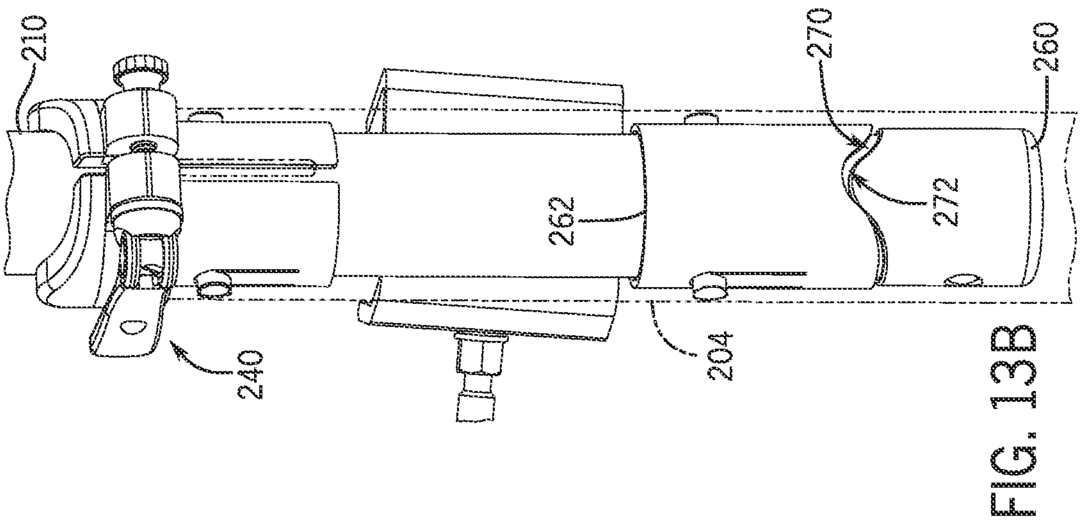
Figure 13A:
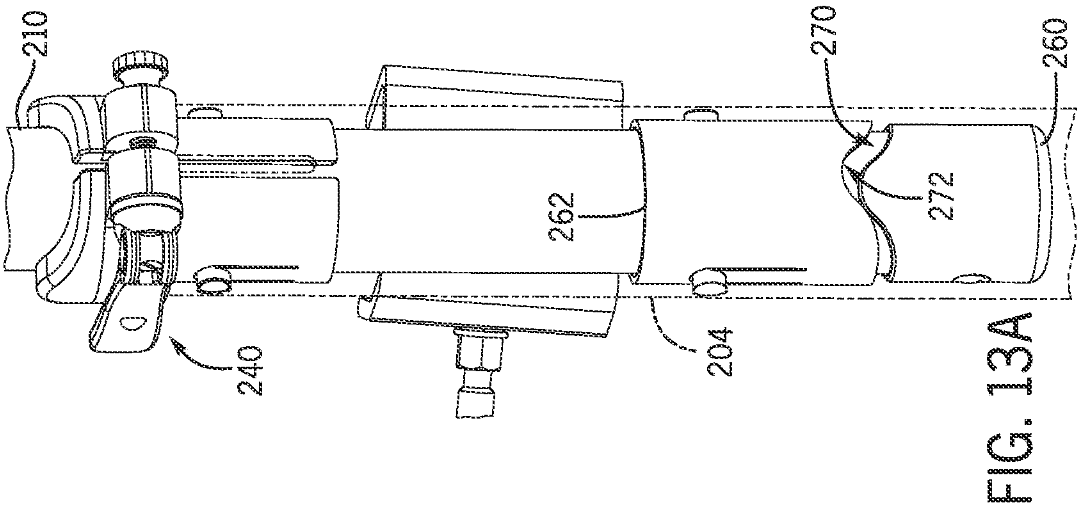

Referring now to FIGS. 13A-13C, a series of figures are shown which illustrate the alignment of the pole 210, and more particularly an opening formed in the pole, 210 with the opening formed in the clamping ring 240 thereby facilitating insertion of the engagement post 246 into the aligned holes. As seen in FIG. 13A, a lower cap member 260 attached to a lower end of the pole 210 is pulled up within the sleeve 204 as the pole 210 is being placed in an extended state. In order to facilitate alignment of openings in the pole 210 and the clamping ring 240 for insertion of the engagement post 246 (see FIGS. 9-12), keyed features on the cap member 260 may be aligned with corresponding keyed features on a collar or insert member 262 within the sleeve 204. As shown in FIGS. 13A-13C, the keyed features may include an undulating surface edge 270 of the cap member 260 and a mating surface edge 272 on the insert member 262. Thus, as the pole 210 is pulled upwards, the undulating surface edge 270 of the cap member 260 (or other keyed feature) engages a portion of the surface edge 272 (or other keyed feature) of the insert member 262 and, if there is some misalignment, as shown in FIG. 13A, the keyed surfaces cause the pole 210 to rotate as it is pulled further upwards relative to the sleeve 204, causing the two members to align with one another as shown in FIG. 13B, and subsequently in FIG. 13C.

Figure 14A:
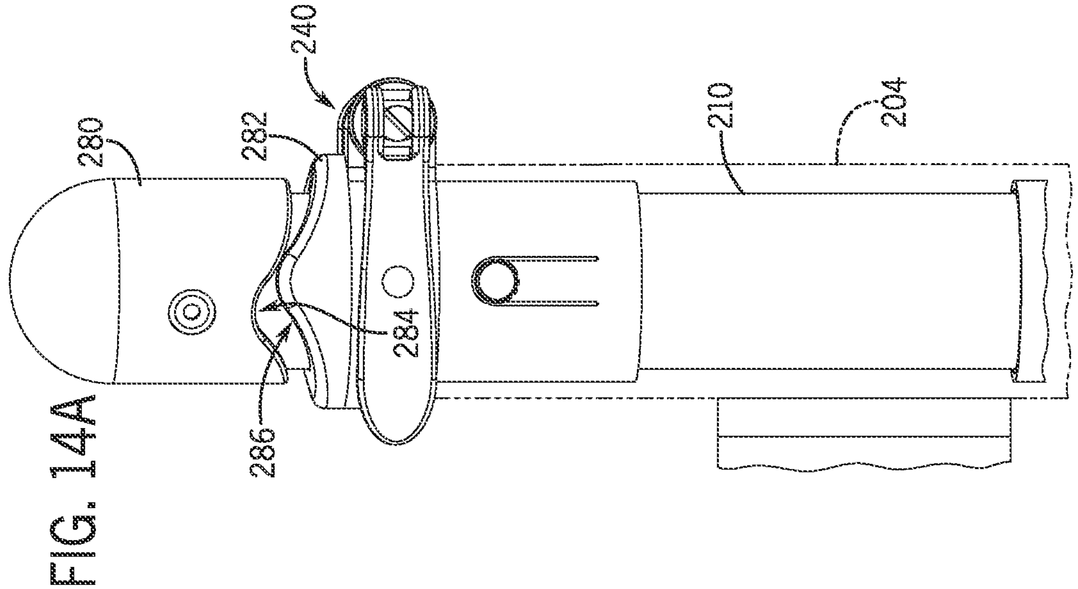
FIGS. 14A-14C show a walkthrough device being aligned as it is being collapsed or retracted.
Figure 14B:
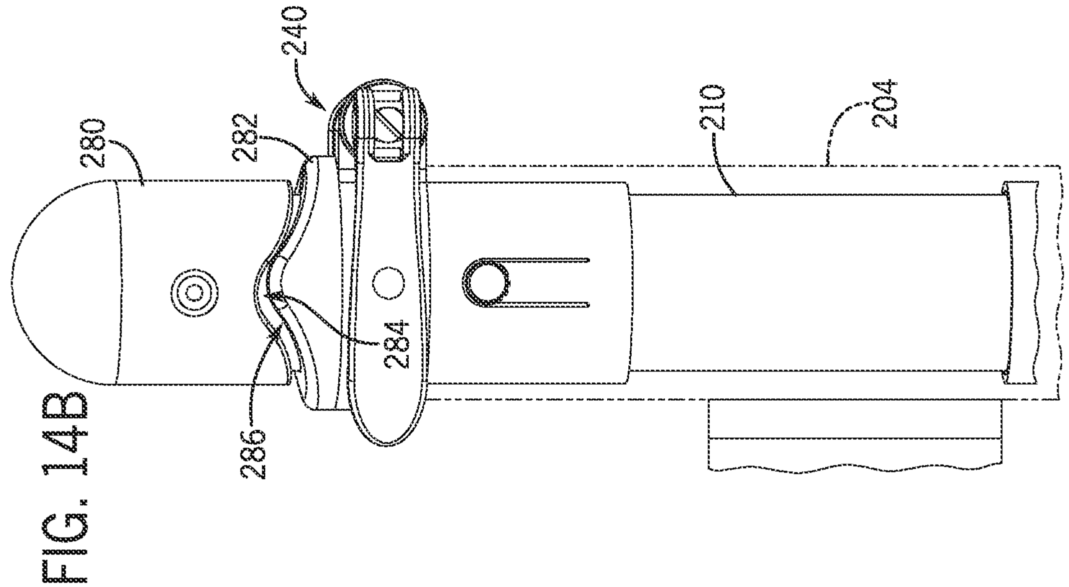
Figure 14C:
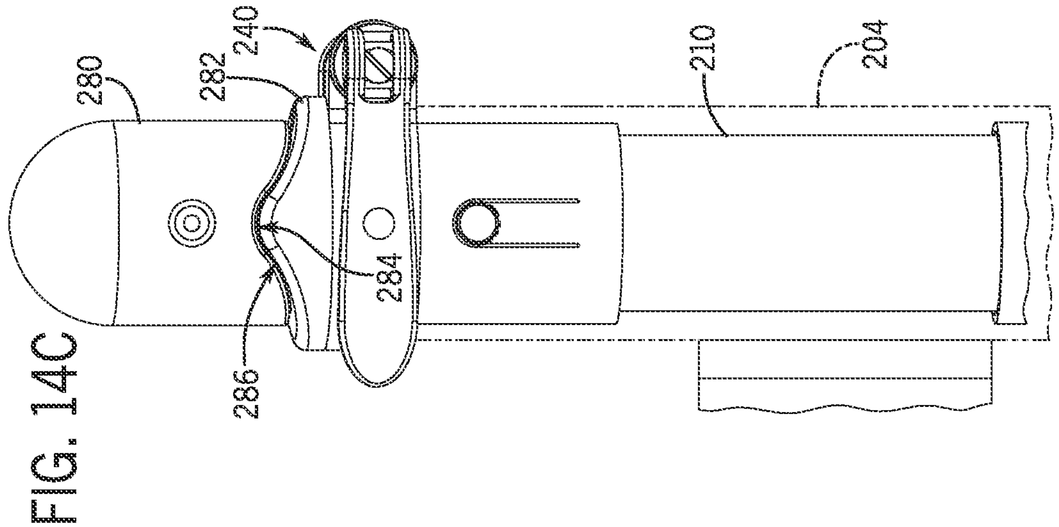

A similar feature is shown for alignment of the pole 210 when it is being retracted as shown in FIGS. 14A-14C. A cap member 280 is positioned at the top end of the pole 210, and a collar 282 is positioned at the top end of the sleeve 204. The cap member 280 may have a key feature that corresponds with a key feature in the collar 282 for alignment of the pole and subsequent engagement of the engagement post with an opening in the pole 210. Again, as shown in FIGS. 14A-14C, the key features may include an undulating lower surface edge 284 of the end cap 280 and a corresponding and mating edge surface 286 formed in the upper portion of the collar 282. Thus, as the pole 210 is pulled or pushed into the retracted position, the mating surfaces 284 and 286 may effect a rotation of the pole 210 (if not already aligned) as it continues downward to its most retracted extent and as illustrated starting with FIG. 14A (showing some misalignment), proceeding to FIG. 14B (showing less alignment as the pole is displaced further downward), and finally proceeding to FIG. 14C wherein the two mating surfaces 284 and 286 are aligned and the pole 210 is fully retracted.

While the invention may be susceptible to various modifications and alternative forms, specific embodiments have been shown by way of example in the drawings and have been described in detail herein. However, it should be understood that the invention is not intended to be limited to the particular forms disclosed. Indeed, features or elements of any disclosed embodiment may be combined with features or elements of any other disclosed embodiment without limitation. The invention includes all modifications, equivalents, and alternatives falling within the spirit and scope of the invention as defined by the following appended claims.

What is claimed is:

1. A ladder comprising:
a first rail;
a second rail spaced apart from the first rail;
a plurality of rungs extending between and coupled to the first rail and the second rail; and
a walkthrough device, comprising:
a sleeve including at least one sleeve aperture and a keyed sleeve mating surface;
a pole slidably coupled to the sleeve and displaceable relative to the sleeve, the pole including a cap member having a keyed pole mating surface, the pole including at least one pole aperture;
an adjustment mechanism positioned adjacent to an end portion of the sleeve, the adjustment mechanism comprising an engagement post selectively insertable into the at least one sleeve aperture and into the at least one pole aperture to lock a position of the pole relative to the sleeve;
wherein the keyed sleeve mating surface and the keyed pole mating surface include undulating portions that, when misaligned and in contact with each other, cause the pole to rotate relative to the sleeve to press the undulating portions together in response to application of a force to move the pole relative to the sleeve; and
wherein in response to sliding engagement of the keyed sleeve mating surface against the keyed pole mating surface, the pole rotates relative to the sleeve to align the at least one sleeve aperture and the at least one pole aperture.

2. The ladder of claim 1, wherein the keyed sleeve mating surface is positioned on a collar extending around the sleeve.

3. The ladder of claim 1, wherein upon insertion of the engagement post into the at least one sleeve aperture and the at least one pole aperture, the first mating surface and the second mating surface are maintained in contact with each other.

4. The ladder of claim 1, the keyed sleeve mating surface is disposed inside the sleeve.

5. The ladder of claim 1, wherein the pole extends at an angle relative to a longitudinal axis of an associated rail.

6. The ladder of claim 1, further comprising:
an insert member disposed at least partially inside the sleeve and around the pole; and
an additional cap member positioned at an end portion of the pole opposite the cap member.

7. The ladder of claim 6, wherein:
the insert member comprises a third mating surface; and
the additional cap member comprises a fourth mating surface.

8. The ladder of claim 7, wherein:
the third mating surface comprises a third keyed surface edge; and
the fourth mating surface comprises a fourth keyed surface edge.

9. The ladder of claim 8, wherein in response to sliding engagement of the third keyed surface edge with the fourth keyed surface edge, the pole rotates relative to the sleeve to an additional aligned position with the third keyed surface edge mating against the fourth keyed surface edge such that the at least one sleeve aperture and the at least one pole aperture are aligned to receive the engagement post.

10. A ladder, comprising:
a first rail;
a second rail spaced apart from the first rail;
a plurality of rungs extending between and coupled to the first rail and the second rail; and
a walkthrough device positioned at a top portion of the ladder, the walkthrough device comprising:
a pole movably attached to the ladder and comprising a first pole end and a second pole end;
a sleeve positioned around the pole and comprising a first keyed end and a second keyed end, the pole being configured to rotate within the sleeve allowing at least one of the first pole end to rotationally align with the first keyed end or the second pole end to rotationally align with the second keyed end; and
an adjustment mechanism to adjust a positioning of the pole between at least two positions comprising a retracted position and an extended position, the adjustment mechanism comprising:
a clamp positioned at least partially around the pole; and
a locking pin positionable through the clamp, the sleeve, and the pole only when:
the first pole end is rotationally aligned with the first keyed end and the pole is in the retracted position; or
the second pole end is rotationally aligned with the second keyed end and the pole is in the extended position.

11. The ladder of claim 10, wherein:
the clamp comprises a lever to engage and disengage the clamp; and
the locking pin is attached to the lever.

12. The ladder of claim 10, wherein the locking pin is sized and shaped for inserting through at least one aperture defined by the clamp or by the pole.

13. The ladder of claim 10, wherein the clamp is adjustable relative to the pole between a first position holding the pole in position relative to the clamp and a second position frictionally grasping the pole.

14. The ladder of claim 10, wherein at least one of the first pole end or the second pole end comprises a keyed feature to align the pole with the sleeve as the pole slides toward the sleeve.

15. A walkthrough device for use with a ladder, the walkthrough device comprising:
a sleeve defining a first aperture and attachable to a rail of a ladder;
a pole slidably coupled to the sleeve and configured for longitudinal displacement and rotational displacement relative to the sleeve, the pole defining a second aperture; and
an adjustment mechanism, comprising:
a clamp coupled to the sleeve and positioned at least partially around the pole, the clamp defining a third aperture;
a lever to engage and disengage the clamp; and
an engagement post protruding from the lever, wherein the engagement post is sized and shaped to simultaneously extend through the first aperture, the second aperture, and the third aperture to selectively lock the pole at a position relative to the sleeve.

16. The walkthrough device of claim 15, wherein the lever comprises a cammed lever rotatable about a pivot point positioned at a first end of the lever.

17. The walkthrough device of claim 16, further comprising a threaded pin coupling ends of the clamp, the cammed lever being configured to apply and release a tensile force upon the threaded pin to correspondingly tighten and loosen the clamp.

18. The walkthrough device of claim 15, wherein the engagement post extends perpendicular to the lever between a first end of the lever and a second end of the lever, the second end being opposite the first end.

19. The walkthrough device of claim 15, wherein the clamp is adjustable to an engaged position in which the clamp holds the pole in position relative to the sleeve.

20. The walkthrough device of claim 15, wherein:

the pole comprises a keyed pole mating surface;

the sleeve comprises a keyed sleeve mating surface; and in response to sliding engagement of the keyed sleeve mating surface against the keyed pole mating surface, the pole rotates relative to the sleeve to align the at least two of the first aperture, the second aperture, and the third aperture that rotate relative to each other.

* * * * *